Sept. 23, 1958 J. J. MOON 2,853,489
PYRIDINE EXTRACTION PROCESS
Filed Dec. 28, 1953
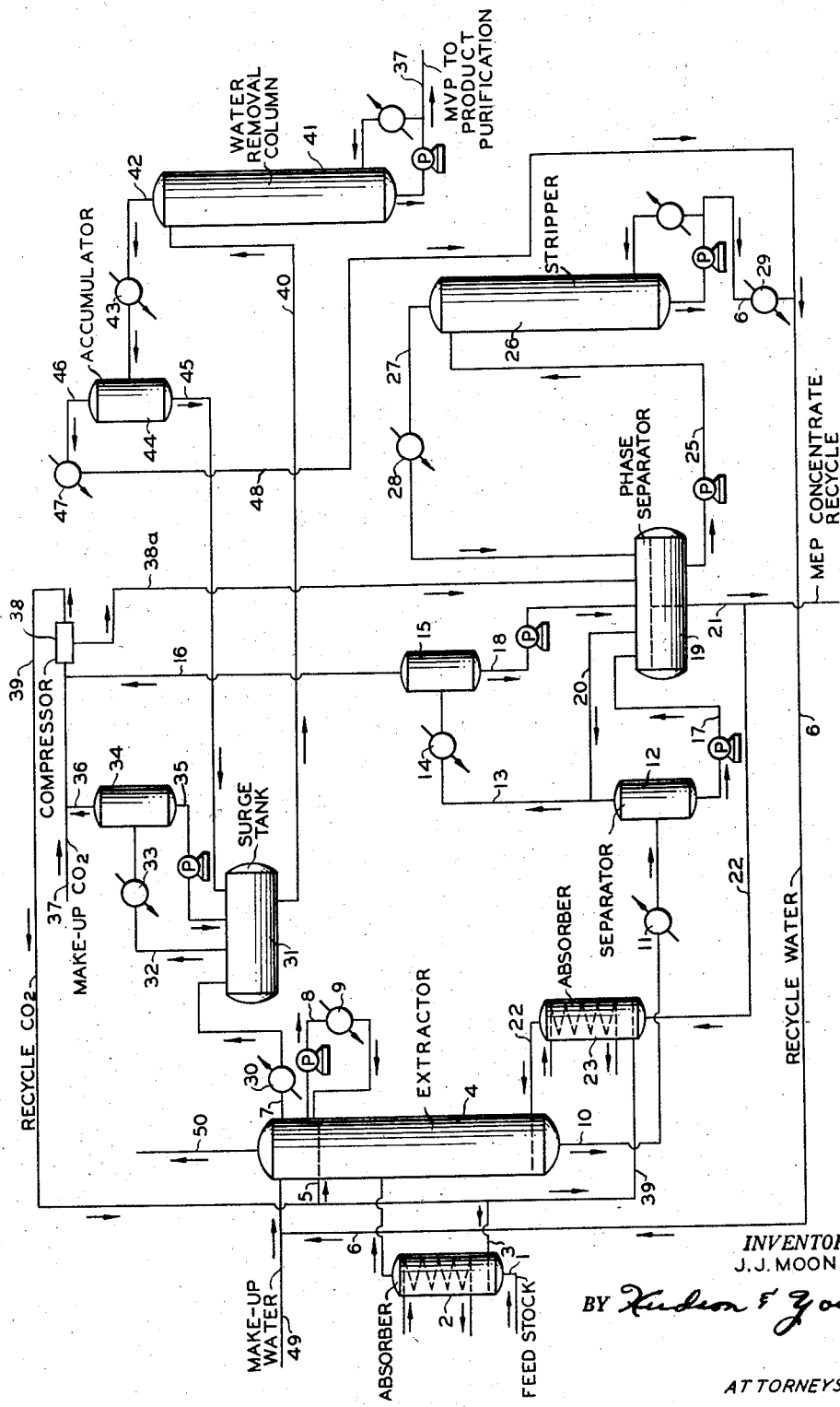
INVENTOR.
J. J. MOON
BY Hudson & Young
ATTORNEYS

United States Patent Office 2,853,489
Patented Sept. 23, 1958

2,853,489

PYRIDINE EXTRACTION PROCESS

John J. Moon, Bartlesville, Okla., assignor to Phillips Petroleum Company, a corporation of Delaware Application December 28, 1953, Serial No. 400,612

7 Claims. (Cl. 260—290)

The present invention relates to the separation of individual organic nitrogen bases from an aqueous mixture thereof. More specifically, it relates to the separation and recovery of two or more heterocyclic nitrogen compounds from an aqueous solution thereof by solvent extraction.

This invention is particularly suited for the separation of close-boiling heterocyclic nitrogen bases, e. g., the separation of 2-methyl-5-vinyl pyridine (MVP) from 2-methyl-5-ethyl pyridine (MEP), a difficult operation by conventional separation methods. If these two compounds are separated by thermal distillation, considerable polymerization of MVP results, since MVP polymerizes to an appreciable degree at elevated temperatures. The separation can be made by vacuum-steam distillation at lower temperatures, but this method has the disadvantage of requiring a very large column with a relatively high operating cost. Solvent extraction was investigated as a possible low cost method for the separation of these pyridines. Aqueous acid solvents, aqueous amine solvents, and aqueous glycol solvents were considered in surveying the field of selective solvents. Most of these were found to have one or more serious disadvantages such as high cost, low selectivity, low solubility, high polymer acceleration, difficult separation between solvent and pyridine, and highly corrosive nature. While acids, for example, are good solvents for pyridine compounds and can be used to separate close-boiling and structurally similar compounds, it is difficult to recover the pyridine from most acids. Ordinarily, this requires at least partially neutralizing the acid, which is expensive and generally impossible in large scale operations. A more significant objection to the use of acids is their tendency to promote polymerization of pyridines.

An exception to the general run of acids is a solution of $CO_2$ in water or carbonic acid. In MEP–MVP separation it meets all the requirements of an acceptable solvent: good solubility and selectivity, low polymer formation, and ease of recovery. In addition, it is not severely corrosive.

It is an objective of the present invention to provide an improved process for the recovery of organic nitrogen bases from liquid mixtures thereof. Another object is the recovery of heterocyclic nitrogen compounds from liquid mixtures thereof by liquid-liquid extraction employing a carbonic acid solution. A more specific object is the separation of MEP from MVP by a liquid-liquid extraction employing a carbonic acid solution.

In its essentials, the present invention comprises treating a liquid stream containing several organic nitrogen bases with an extractor solution of $CO_2$ in water. Since $CO_2$ and water, on one hand, and carbonic acid, on the other, will be in equilibrium, the acidity of this solution may be increased by dissolving more $CO_2$ in the water, as, for example, by using higher pressures to cause more $CO_2$ to dissolve. Typical of the separation columns suitable for liquid-liquid extraction of this type is that described in the Koch patent, U. S. 2,401,569. The feed stream enters such an extractor column at about its center, water enters at the top; $CO_2$ is injected into the column several trays below the top and some is generally premixed with the feed. The water flows down through the column, extracting from the feed the bulk of the stronger nitrogen bases, which are more soluble in carbonic acid than the weaker nitrogen bases. The latter rise through the downflowing carbonic acid column and are withdrawn at the top of the column as raffinate. Water entering at the top of the column serves both to absorb $CO_2$ and to wash or extract $CO_2$ from the raffinate. In the typical case where MVP and MEP are the nitrogen compounds being separated, the solubility of MEP in water increases as the concentration of $CO_2$ in the water increases, and vice versa. It is therefore desirable to have MEP present when the carbonic acid solution is being prepared. The $CO_2$ is introduced at a point below the point where the water enters and is absorbed as it moves countercurrently through the downflowing water. A heat exchange means is provided to remove the heat of solution of $CO_2$ from the solvent stream. Also, cooler-absorber vessels are provided in the feed and reflux streams to supply the desired concentration of $CO_2$ and, at the same time, to cool them to the temperature of the extractor column. The nonaqueous raffinate and the aqueous extract are cooled and depressurized to release $CO_2$ therefrom, dewatered, and subjected to suitable separation treatments to recover MVP and MEP, respectively.

The separation of solvent from nitrogen bases in the extract is easily made in accordance with this invention. The invention, of course, pertains only to nitrogen bases which form aqueous and non-aqueous phases with water, the invention being carried out under conditions such that one of the nitrogen bases is more soluble than the other in aqueous solutions. In addition, the more basic nitrogen base must be at least as water-soluble as the less basic compound (so that solubilities and pH values will be in the same direction). The degree of basicity is a measure of the ionization constant. By "nitrogen bases" I mean compounds such as aliphatic and aromatic amines, quaternary ammonium salts, and heterocyclic nitrogen compounds which may be considered organic substitution products of ammonia. By a "heterocyclic nitrogen compound" I mean a compound containing a heterocyclic nitrogen atom. The invention is applicable for the separation not only of aliphatic and aromatic amines, octylamine, hexylamine, aniline derivatives, etc., but of pyridine derivatives, quinoline derivatives, piperidine derivatives, carbazole derivatives, and the like.

The invention is particularly applicable for the separation of readily polymerizable compounds such as methylvinylpyridine from methylethylpyridine. For example, 2-methyl-5-vinyl pyridine (MVP) is produced by catalytic dehydrogenation of 2-methyl-5-ethyl pyridine (MEP) according to the following reaction:

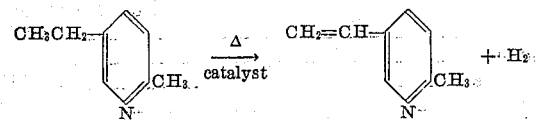

In addition to the main product, MVP, a certain amount of pyridine, as such, 2-picoline, 3-picoline, 3-ethyl pyridine, lutidine (2,5-dimethyl pyridine), and 3-vinyl pyridine by-products are produced.

The vinylpyridines are useful intermediates in the preparation of fibers, adhesives, ion exchange resins, and synthetic rubber. The recovery of unreacted MEP and MVP from the dehydrogenation product poses a separation problem which can be efficiently handled by the method of the present invention.

Another specific example of the versatility of the present invention is the separation of VEP (2-vinyl-5-ethyl pyridine) from MEP (2-methyl-5-ethyl pyridine). VEP is the equivalent of MVP in many respects and is prepared by reacting MEP with formaldehyde and dehydrating the reaction product, according to the following reactions:

(1)

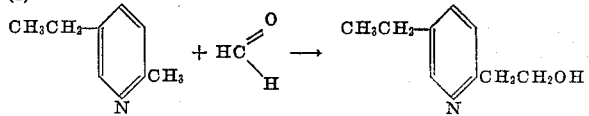

(2)

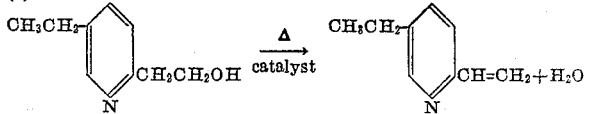

The product from the above dehydration reaction poses a separation problem similar to that of MVP–MEP separation in that in both cases the vinyl component polymerizes at elevated temperatures.

As indicated, $CO_2$ dissolved in water to form the solvent of this invention will form a raffinate and an extract, each richer in their respective components than the feed on a solvent-free basis. Normally, sufficient $CO_2$ is dissolved in water to ensure a desired solubility level, say sufficient so that at least twice as much of the mixture of nitrogen bases dissolves in the solution as would dissolve in the water in the absence of $CO_2$. A convenient method of keeping sufficient $CO_2$ in solution is to operate with water saturated, or almost saturated, under operating conditions which will depend primarily upon the extent of solubility of nitrogen bases to be separated, say a temperature of from 40° F. to 200° F. and a pressure of from 50 to 400 p. s. i. g.

The selectivity of the acid extraction is a function of the dissociation of the several nitrogen bases in the mixture. In the case of MEP–MVP mixtures, as presently understood, selectivity does not depend upon salt formation and it is believed that little salt formation occurs. While there may be some type of selective neutralization, any bonding to form salts must be very weak because it is broken by mere depressurizing.

This invention will be more readily understood by reference to the accompanying drawing, taken in conjunction with the example below. In the drawing, reference to the final details of product purification, by-product recovery, etc., have been omitted. Only sufficient equipment to illustrate the basic extraction process has been shown.

*Example*

Referring to the drawing, the feedstock is admitted to the system through line 1 at the rate of 33,571 pounds/stream day and at a temperature of 150° F. This stream has the following composition in terms of pounds per stream day:

| | Lbs./stream day |
|---|---|
| Water | 4,591 |
| 2-picoline | 544 |
| 3-picoline | 512 |
| 4-picoline | 21 |
| 2,5-dimethyl pyridine | 608 |
| 3-ethyl pyridine | 320 |
| 3-vinyl pyridine | 670 |
| 2-methyl-5-ethyl pyridine | 18,960 |
| 2-methyl-5-vinyl pyridine | 6,973 |
| Higher pyridines | 25 |
| Heavy oils | 109 |
| Tars | 38 |
| Polymer | |
| Inhibitor | 200 |
| Total | 33,571 |

This stream enters vessel 2, a combination cooler and $CO_2$ absorber. Here the feedstock temperature is reduced to 95° F. by indirect heat exchange with a suitable coolant, for example, water. At the same time, gaseous $CO_2$ is injected into the feedstock through line 3 at the rate of 3950 pounds/stream day and is absorbed by the feedstock which is then introduced into extraction column 4 at about its center. Column 4 is a cylinder 5½' in diameter and 125' high with 55 inverted Koch trays. $CO_2$ is injected into the column several trays below the top through line 5, a branch of line 39, at the rate of 39,856 pounds/stream day. Water, mostly recycle from a later step in the process and admixed with minor amounts of the components present in the feedstock, is admitted near the top of the column through line 49 at the rate of 919,085 pounds/stream day, of which said other components constitute 3315 pounds/stream day. The $CO_2$ from line 5 bubbles up through the water, dissolving therein to a large extent to form carbonic acid in situ which solution flows down through the column countercurrently to the feedstock admitted through line 1. The descending acid solution selectively dissolves the more basic component, MEP, as it contacts the feedstock and, hence, the extract withdrawn at the base of the column through line 10 is richer in MEP than was the feedstock. This extract is withdrawn at the rate of 1,019,200 pounds/stream day and contains 923,500 pounds of water and 43,800 pounds of MEP, the remainder being assorted pyridines and picolines present in the feedstock. The MVP in the feedstock, being less soluble in the descending carbonic acid than the MEP, rises countercurrently therethrough, emerging as raffinate at the top of the column from which it is withdrawn through line 7. Water entering the top of the column through line 49 scrubs $CO_2$ from the raffinate stream and absorbs it, the $CO_2$ migrating from the solution in which it is more highly concentrated to the solution of lower $CO_2$ concentration. In addition the water unavoidably becomes saturated with MVP. To remove the heat of solution of $CO_2$ in water, a side stream is constantly withdrawn from the upper portion of column 4, above the point of $CO_2$ introduction, circulated through line 8 and heat exchanger 9, and returned to the column.

The extract withdrawn through 10 circulates through extract heater 11 where it is heated from 95° F. to 150° F., and is then admitted to flash separator 12, which is held under a pressure of 2 p. s. i. g. This combination of low pressure and high temperature flashes off all but a trace of the $CO_2$ from the extract, along with minor amounts of water and pyridine compounds. The $CO_2$ is withdrawn overhead through line 13 and cooled from 150° F. to 90° F. in extract cooler 14; here over 80 percent of the moisture content and all but the last traces of the pyridine content of the $CO_2$ collects. The substantially pure $CO_2$ is withdrawn overhead from knockout drum 15 through line 16 and sent to line 37 for passage through compressor equipment, indicated generally at 38, preparatory to its recycle to column 4. The bottoms from flash separator 12 and knockout drum 15 are withdrawn through lines 17 and 18, respectively, and pumped into phase separator 19, maintained at a temperature of 150° F. and a pressure of 2 p. s. i. g. This is a duplication of the conditions in flash separator 12; substantially all of the $CO_2$ remaining in the combined bottoms is flashed off and passed through line 20 to line 13 where it combines with the overhead from flash separator 12. With the liberation of the $CO_2$, the liquid separates into two phases. As indicated by the dotted line, a lower aqueous phase and an upper organic phase forms in 19. The upper phase consists of MEP admixed with minor amounts of water and other pyridines. This phase is drawn off through pipe 21, the top of which extends above the interface of the two phases, and divided into two approximately equal portions; one portion recycled as reflux through line 22 and reflux cooler-absorber 23, described below, to the lower portion of column 4. The other portion is suitably processed for concentration of the MEP and recovery of by-products. The aqueous phase from separator 19 is withdrawn through line 25 and passed to a water stripper 26. This is a tray column 42" x 30' maintained at a pressure of 2 p. s. i. g., a top temperature of 210° F., a bottom temperature of 217° F., and equipped with a conventional reboiler. The overhead from 26, principally water and MEP, plus minor amounts of lower pyridines and picolines, is recycled through line 27 and condenser 28 to phase separator 19. Water withdrawn from the base of 26 through 6 is cooled at 29 and returned to column 4, makeup $H_2O$ being added at 49.

The raffinate is withdrawn from column 4 at line 7 at 12,700 pounds/stream day; this is about 65% MVP, 14% water, and 8% $CO_2$, all in parts by weight; the remainder contains minor amounts of other pyridines and heavy residues. This is heated from its withdrawal temperature of 100° F. to a temperature of 150° F. in raffinate heater 30 and then introduced into a raffinate surge tank 31. This is maintained at a temperature of 150° F. and a pressure of 2 p. s. i. g.; the $CO_2$ in the raffinate is flashed off and passed via line 32 through cooler 33, wherein it is cooled from 150° F. to 95° F., at which temperature it enters knockout drum 34. Here the pyridines entrained in the $CO_2$ condense out and are returned through line 35 to raffinate surge tank 31, with the now substantially pure $CO_2$ passing overhead through 36 into makeup-$CO_2$ line 37. Line 37 conveys the combined $CO_2$ streams to a three-stage compressor indicated generally at 38. This compresses the $CO_2$ successively to 34 p. s. i. g., 145 p. s. i. g., and 505 p. s. i. g. At the latter pressure it is returned through line 39 to the extraction system where it divides into three approximately equal streams; one-third through line 5 to column 4, one-third through line 3 to feed cooler-absorber 2, and the remaining one-third to reflux cooler-absorber 23. The latter is pressured to 500 p. s. i. g. and, by indirect heat exchange, cools reflux stream 22 from 150° F. to 95° F. Under this combination of cooling and high pressure, reflux stream 22 becomes saturated with $CO_2$ to substantially the same degree as the feedstock in vessel 2, and both enter column 4 at the same temperature. Condensate from the intercoolers in compressor 38 passes through line 38a to extract phase separator 19. The condensate is principally water, but contains about 15% MEP by weight and traces of other pyridines.

The liquid bottoms removed from 31 is about 75% MVP by weight and 12% water by weight, the remainder consists mainly of minor amounts of other pyridines. This stream passes through line 40 to a water removal column 41. This is a vertical cylinder 25' high and 30" in diameter filled to a height of 20' with Raschig rings and equipped with a conventional reboiler. Column 41 operates at a top temperature of 135° F. and a top pressure of 23 mm. mercury absolute. Dry MVP, admixed with minor amounts of MVP polymer, polymerization inhibitor, and other pyridines, is removed at the base of column 41 and sent to suitable purification apparatus for recovery of MVP and by-products. The overhead is withdrawn through line 42 and cooler 43 to accumulator 44 maintained at 95° F. and a pressure of 22 mm. of mercury absolute. This condenses out the MVP, along with minor amounts of other pyridines; this condensate is returned through line 45 to the top of raffinate surge tank 31. The overhead from 44 passes through line 46 to condenser 47; the water condensate is removed through line 38 and combined with the water in line 6.

A small amount of $H_2$ and $N_2$ is vented from column 4 through line 50, along with some $CO_2$.

It is believed apparent that the invention is not limited to the foregoing examples, these being but illustrative, and that various modifications can be made in the way of temperature, pressure, equipment, etc., without departing from the spirit of the invention. Thus while the specific example shows dividing into two equal parts the phase drawn off through line 21, so that one half goes back to the extraction column as reflux, it should be made clear that this is merely illustrative, not limiting. The amount of reflux returned to a tray separator of the type described here depends on such factors as the difficulty of separation of the several components of the feedstock and the design and capacity of the equipment, e. g. the number of trays. The amount of reflux necessarily varies according to the particular separation and equipment involved. Also, in the specific example, the $CO_2$ in recycle line 39 was shown divided equally between column 4, feed cooler-absorber 2, and reflux cooler-absorber 23. This also varies according to the liquid flow rate passing the several points of $CO_2$ injection. Ideally, the amount of $CO_2$ admitted to each of the points is the amount necessary to saturate with $CO_2$ the solutions flowing past said points. Thus, if the amount of reflux sent to absorber 23 is reduced by 50% from that recited in the example, then the amount of $CO_2$ admitted to 23 would be reduced 50%. While the make-up water is shown added at 49, it can be added at other points, also. For example, if a steam jet is used to pull the vacuum on accumulator 44, the steam could be condensed in 47 and thus added to the system.

I claim:
1. In a process for resolving a mixture of heterocyclic nitrogen compounds in which a feed stock comprising an aqueous solution of heterocyclic nitrogen compounds of varying basicity is introduced into the intermediate portion of a vertically elongated extraction zone, carbonic acid solution is allowed to descend through the feed stock whereby the more basic heterocyclic compounds in the feed stock are selectively extracted by said acid, the resulting extract is washed with an upflowing reflux stream obtained in a manner hereinafter described and the extract is withdrawn from the base of the extraction zone, a raffinate richer in the less basic heterocyclic nitrogen compounds on a solvent-free basis than the feed mixture is withdrawn from the upper portion of the extraction zone, carbon dioxide is liberated from the withdrawn raffinate and extract, the decarbonated extract is allowed to separate into an aqueous and an organic phase, a portion of the organic phase is withdrawn, said organic phase is substantially saturated with carbon dioxide and returned to the lower portion of the extraction zone as reflux, the improvement which comprises saturating the feed stock with carbon dioxide, introducing a water stream into the upper portion of the extraction zone, introducing carbon dioxide into said zone between the feed stock stream and the water stream and absorbing carbon dioxide from the ascending raffinate in the water stream to form the carbonic acid employed in the liquid-liquid extraction.

2. The process of claim 1 wherein the remainder of the organic phase of the extract is dewatered and concentrated for recovery of the more basic heterocyclic compounds.

3. The process of claim 1 wherein the raffinate is dewatered and concentrated for recovery of the less basic heterocyclic nitrogen compounds.

4. In a process for the separation of methylvinylpyridine and methylethylpyridine from an aqueous solution thereof in which said solution is introduced into an intermediate point of a vertical extraction zone, carbonic acid solution is flowed downwardly through the solution whereby the methylethylpyridine is selectively dissolved in said carbonic acid and removed as extract from the base of the extraction zone while the methylvinylpyridine rises through the extraction zone and is withdrawn near the top as raffinate, and methylethylpyridine is recovered from said extract and methylvinylpyridine is recovered from said raffinate, the improvement which comprises saturating said solution with carbon dioxide, introducing water into the upper portion of the extraction zone, introducing carbon dioxide into the upper portion of said zone at a point between the entry of said solution and water streams and absorbing the carbon dioxide in the water to form the carbonic acid employed in the extraction process.

5. The process of claim 4 comprising in addition, separating the water from the decarbonated water and extract, leaving a methylethylpyridine concentrate and a methylvinylpyridine concentrate, combining the water into one stream and recycling it to the extraction zone.

6. The process of claim 4 comprising the additional steps of freeing the withdrawn extract of carbon dioxide, allowing the decarbonated extract to separate into an aqueous phase and an organic phase consisting primarily of methylethylpyridine, dividing said organic phase into two portions, substantially completely saturating one portion with carbon dioxide and returning said saturated portion to the lower region of the extraction zone as reflux.

7. The process of claim 6 wherein the carbon dioxide liberated from the extract and raffinate is compressed and divided into three streams, said streams being injected into the feed stock, the extraction zone and the reflux, respectively.

References Cited in the file of this patent

UNITED STATES PATENTS

| | | |
|---|---|---|
| 1,965,828 | Fox | July 10, 1934 |
| 2,082,034 | Smith | June 1, 1937 |
| 2,189,278 | Bailey | Feb. 6, 1940 |
| 2,288,281 | Huijser | June 30, 1942 |
| 2,486,778 | Doumani | Nov. 1, 1949 |
| 2,516,370 | Cracas | July 25, 1950 |
| 2,541,458 | Berg | Feb. 13, 1951 |
| 2,556,228 | Sauders | June 12, 1951 |
| 2,569,391 | Stearns | Sept. 25, 1951 |
| 2,755,282 | Hachmuth | July 17, 1956 |